3,695,964
Patented Oct. 3, 1972

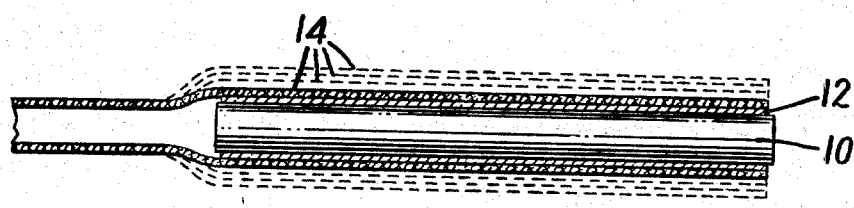
FIG. 1
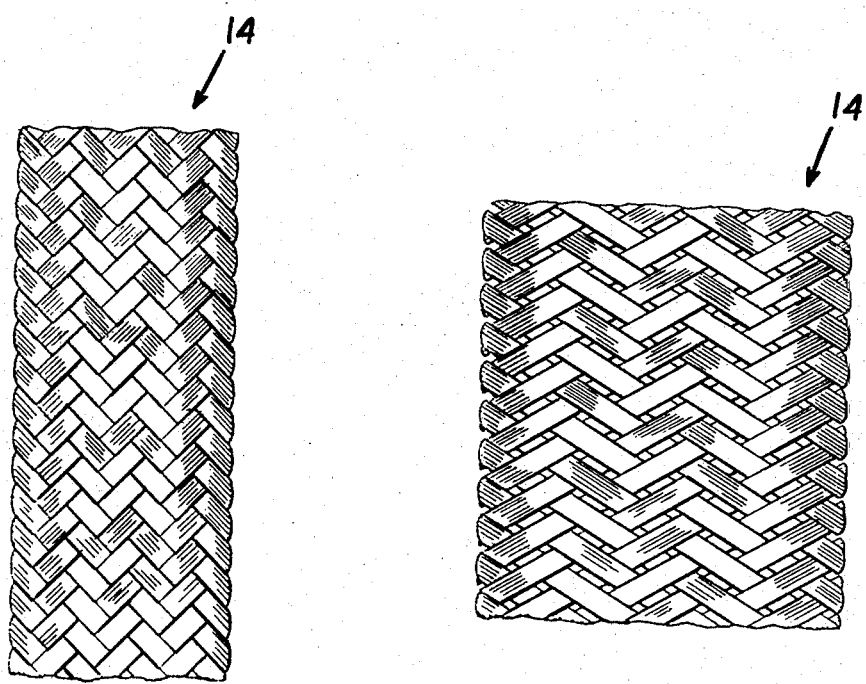
FIG. 2
FIG. 3

3,695,964
SUPPORT FOR SEMIPERMEABLE MEMBRANE
Alfred Shaines, Fanwood, Robert L. Kalish, East Brunswick, and Edward A. G. Hamer, Metuchen, N.J., assignors to Abcor Water Management Company, Inc., Cambridge, Mass.
Application Oct. 28, 1968, Ser. No. 770,979, which is a continuation-in-part of application Ser. No. 508,307, Nov. 16, 1965. Divided and this application Jan. 16, 1970, Ser. No. 3,295
Int. Cl. B32b *31/12;* B29c *27/00*
U.S. Cl. 156—161                                    20 Claims

ABSTRACT OF THE DISCLOSURE

The invention provides a cylindrical rigid porous support for an osmotic or ultrafiltration membrane. The support is made of braided fiber sleeves, which are intimately conformed to a mandrel by axial lengthening and consequent radial shrinkage of the braided fibers around the mandrel and which are then permanently cemented together in such conformed position with a limited amount of cement to leave open interstices between the fiber crossover points.

---

This application is a division of Ser. No. 770,979, now Pat. No. 3,547,272, filed Oct. 28, 1968, a continuation-in-part of co-pending application Ser. No. 508,307, now abandoned, filed Nov. 16, 1965.

The present invention relates to porous supports for semipermeable membranes of the type used to carry out reverse osmosis or ultrafiltration. More particularly, the invention relates to a porous cylindrical support tube having a tubular semipermeable membrane inserted in it as a liner or wrapped about its exterior as an outer sleeve.

As is known, when solutions of different concentrations are separated by an ideal semipermeable or osmotic membrane, the pure solvent will pass from the dilute solution through the membrane into the concentrated solution until an equilibrium point is reached. At this point, the difference in solution pressure on opposite sides of the membrane is the osmotic pressure difference between the two solutions. If pressure greater than this pressure is applied to the concentrated solution, then the pure solvent will flow from the concentrated solution through the membrane to the dilute solution and this is known in the art as reverse osmosis. An actual membrane of suitable permeability will pass a relatively greater proportion of solvent than solute during the reverse osmosis flow and, in this way, solvents can be separated from solutions.

Reverse osmosis has specific application to the desalination of sea and brackish waters and to other separation processes where recovery of solvent or more concentrated solution is desired. The solvent recovery flow rate and the general efficiency of reverse osmosis processes are improved if a thin semipermeable membrane is used. This requires that the membrane be given mechanical support since it is usually very fragile and incapable by itself of withstanding the reverse osmosis pressure to which it is subjected during the process.

Heretofore, various forms of supports for the semipermeable membrane have been proposed, including modified conventional plate and frame filter press assemblies. These have the disadvantage of being costly to construct and operate if a reasonable permeation rate is to be achieved. Other proposed forms of supports have been cylindrical pipes or tubes made of woven or filament wound glass fibers, but such structures have generally been incapable of withstanding high reverse osmosis working pressures on the order of 1,000 to 1,500 p.s.i.

The present invention provides a porous cylindrical support tube for semipermeable or osmotic membranes, which avoids the drawbacks mentioned above and provides new and valuable advantages in the operation of reverse osmosis processes. One of the most important advantages is the fact that the cylindrical porous support tubes of the invention can readily withstand reverse osmosis working pressures of 1,000 p.s.i. and higher with virtually no tendency for cracking, bursting or otherwise failing in structural integrity. Since the solvent recovery rate is correlated, in part, dictly to the magnitude of the reverse osmosis working pressure, the greater strength of the support tubes of the invention permits more rapid and efficient separations. Another advantage is the fact that the cylindrical porous support tubes of the invention develop the required porosity during their manufacture by an inherent self-adjusting mechanism that is provided by a critical braided form of interlacing of the reinforcing fibers that are included as part of the tube structure. This, in turn, allows use of self-reacting adhesives which do not shrink or evolve volatile material during cure, since the required porosity is achieved by mechanical adjustment of the reinforcing fibers and there is no need for use of an adhesive which becomes porous during its cure. Another advantage is that only a small proportion of adhesive binder is required in the final support tube, since the braided fibers or strands themselves provide high mechanical strength, even without an adhesive. Thus, the tubes of the invention can be made using an "adhesive starved" system to obtain adequate porosity, high mechanical strength from the braided fibers or strands, and a minimum proportion of adhesive which is always the potentially weakest element in the entire structure. Another important advantage of the invention is that the braided fibers or strands included in the support tubes make the tubes capable of resiliently expanding and contracting to complement the mechanical supporting strength provided by the reinforcing fibers themselves, whereby the overall strength of the final tube to withstand the reverse osmosis working pressure is considerably enhanced. Another advantage is the fact that the porous cylindrical tubes of the invention can be readily manufactured in commercial quantities with a high degree of control and precision, whereby desired specifications for the tubes can be readily duplicated in successive lots or batches.

The foregoing advantages are achieved in accordance with the invention by use of reinforcing fibers or strands which are in the form of a braided sleeve when assembled as part of the porous cylindrical tubes. These braided sleeves have the characteristic capibility of undergoing considerable change in the relationship of diameter to length, that is, as the length of the sleeve is decreased its diameter will increase and as the length is increased the diameter will decrease. This capability is utilized in the invention to manufacture support tubes having the great strength and other advantages previously described by applying axial tension to each layer of sleeving, while it is in place around a mandrel, to mechanically conform the sleeving and its reinforcing fibers or strands with high compression to the contour of the mandrel. More specifically, in the manufacturing process, at least one braided sleeve is fitted loosely over and around a cylindrical mandrel, the diameter of the sleeve being enlarged, if necessary, to achieve this initial mounting by shortening the sleeve length. Then, a tension force is applied to the loosely-mounted sleeve tending to increase its length, either by pulling its ends, or by anchoring one of its ends and pulling the opposite end. In reacting to this force, the mounted sleeve will shrink diametrally and thereby all of its braided strands or fibers are induced to exert a radially inward compression about the mandrel surface. This, in turn, produces an intimate, close fitting or molding of the braided fibers or strands to the contour of the mandrel. When a limited proportion of adhesive resin is applied to and cured in the conformed sleeve so as not to fill its interstices but only bond the fiber or strand crossover points, a final tube is obtained having virtually the identical shape of the mandrel and with all of the fibers or strands thereof aligned in a perfect orientation as dictated by the mechanical increase in length-decrease in diameter force that was used to conform the sleeve to the mandrel.

While it is possible to produce a porous support tube with a single layer of braded sleeve as described above, for best results it is recommended that a plurality of sleeve layers be used. This gives the added advantage that each successive sleeve layer, as it is loosely mounted and then mechanically conformed by diametral shrinking, reinforces all of the preceding layers so that a thin, dense, compact wall thickness is developed through the thickness of all the layers. The porosity required for passing solvent by reverse osmosis is retained even with a plurality of sleeve layers, since the interstices of each layer are oriented randomly both in and out of registry with those of the preceding and succeeding layers and application of a limited proportion of adhesive resin maintains solvent flow paths open through the entire wall thickness of the multiple sleeve layers.

With use of two to five layers of braided sleeves, in the manner described above, final support tubes are achieved which provide tremendous self-reinforcement by mechanical interlacement and conformation of fibers or strands to the one and only orientation that can be assumed under the force applied to generate axial lengthening and diametral shrinkage upon the mandrel. It is to be noted that the adhesive resin has nothing to do with developing such orientaton, but only in maintaining it. Thus, the function of the adhesive is to provide sufficient internal bonding and consolidation to permanently retain the orientation mechanically developed in the braided sleeves and, therefore, it need be applied only in a very limited proportion to perform this limited function. This not only allows use of self-curing, non-porous adhesives in economical quantities, but also means that the stresses of reverse osmosis working pressure are absorbed and withstood primarily by the braded strands or fibers, and the operating limits of the support tube are a function of the maximum strength of the strands or fibers, rather than the adhesive. When inherently strong materials such as glass fibers are used in the braided sleeves, final support tubes of unprecedented strength are achieved capable of operating over a long duration under reverse osmosis pressures of up to 1500 p.s.i., which to applicants' knowledge has not been possible before.

The specific form of braiding in the glass fiber sleeves is not critical. The only requirement is that some form of braiding be used, and not woven or filament-wound structures which are incapable of providing the advantages of the invention previously described. Therefore, the glass fiber sleeve may have any braided form in which one or more strands cross diagonally and alternately over and under one or more strands laid in the opposite direction or at an angle.

The adhesive resin may be any waterproof material which will bind the reinforcing fibers and not contaminate the solvent side of the tube during use in reverse osmosis. Generally, excellent results have been achieved with use of epoxy resin adhesives of proper viscosities which are preferred. Other sealing materials such as polyesters and the like which can also be applied in liquid form and then cured to a permanent set are suitable.

The liquid adhesive is applied in excess to the braided stretched sleeve of glass fiber material on the mandrel in any convenient manner, as for example by brushing or dipping. The saturated fibers are then compressed to wring out the excess liquid resin. This is most conveniently done by a peristaltic force, e.g. by drawing a close-fitting ring downward over the sleeve, or by rubbing with a sponge or the like to remove as much of the liquid adhesive as can be removed by such means. The remaining liquid adhesive tends to collect by reason of surface tension at the various points where one strand of fiber crosses another, leaving open pores, substantially free of adhesive in the interstices between them.

The adhesive resin is then hardened. In some cases, the adhesive may be formulated to be self-hardening after a limited period of time. In the case of epoxy and polyester resins, for example, a polymerization catalyst is added to the liquid resin shortly before it is used, and the resin polymerizes to a solid shortly thereafter. Depending on the adhesive system used, it may be necessary to perform an after-treatment such as heating or the like in order to harden it.

Once the adhesive has hardened, the completed support tube is then taken off the mandrel and is ready for use after any necessary end-fittings and the like have been added. The adhesive is preferably applied in the form of a solution in a volatile solvent, the particular solvent depending on the adhesive used. The resulting reduction in viscosity adds to the mobility of the adhesive, facilitating its migration to the fiber crossing points and the subsequent removal of excess.

The support tubes according to this invention may be used either as internal or external supports, but are primarily intended for use as external supports, into which a tubular membrane may be inserted as a liner. In either type of use, it is of great advantage that the face of the tube in contact with the membrane be as smooth and regular as possible. When the supporting surface is not smooth, the pressurized brine or other solution to be purified may force the membrane to conform to the irregularities of the support, setting up local tensile strains in the membrane which adversely affect its selectivity and service life.

Therefore, in a preferred embodiment of the invention the inner surface of the support tube is made particularly smooth by applying one or more layers of a smooth liner around the mandrel before applying the glass fiber sleeves forming the principal structure of the support tube. By way of example, one or more layers of pure, smooth paper, such as fine filter paper, may be pre-moistened with water, or with a dilute polyvinyl alcohol solution, and wrapped around the mandrel. The assembly is then dried to prevent interference of the water with proper impregnation of adhesive. Braided glass fiber sleeves are applied and the composite assembly impregnated, compressed to remove excess adhesive, and allowed to harden on the mandrel as previously described. After the adhesive has hardened, this smooth liner becomes integral with the sleeving of the support structure. Other materials may be used in place of paper. For example, thin sheets of glass fiber matting have also been used with good results. In fact, any smooth porous material or finely woven or braided cloth which can be integrally bound to the inner surface of the glass fiber tube by the adhesive used, and does not contaminate the purified water (and is not adversely affected by it) may be used.

In cases where the smooth inner liner limits the porosity of the structure when the sleeve of glass fiber material is several plies thick, the adhesive may be applied and the excess squeezed out after each ply of sleeving is applied to the mandrel or the resin may be applied and squeezed out once after all the plies of alternating sleeving are in place. A resin solution containing a relatively large proportion of solvent can be applied to the first several plies, the excess squeezed out and the resin hardened, additional plies added and resin containing a relatively smaller proportion of solvent applied to these, the excess squeezed out and the resin hardened. Such a process makes for a support tube with a highly porous inner layer and an outer layer of lower porosity.

Further details of the invention will be readily understood by reference to the accompanying drawings which illustrate a preferred embodiment thereof and of which:

FIG. 1 is a cross-sectional view showing a mounted assembly of paper liner and stretched braided glass fiber sleeves upon the mandrel;

FIG. 2 is a fragmentary view of a portion of the braided side wall of the glass fiber sleeve on a greatly magnified scale prior to mounting of the sleeves in the assembly of FIG. 1; and FIG. 3 is a view similar to FIG. 2 showing the changes in configuration of the braided side wall of the glass fiber sleeve after it has been diametrally enlarged during its mounting upon the assembly of FIG. 1.

Referring to FIG. 1 reference numeral 10 denotes a mandrel comprising a solid rod of polytetrafluoroethylene. A layer of wet filter paper 12 is wrapped around mandrel 10, and overlapped along the length of the mandrel 10. After the paper 12 has dried, a first braided sleeve 14 of glass fiber is slipped over the paper 12 upon the mandrel 10, in the left to right direction.

Referring to FIG. 2, it will be seen that the braided glass fibers are closely adjacent each other with little open space between each fiber. This configuration represents the braided glass fiber sleeve 14 prior to being slipped over the mandrel 10.

Referring to FIG. 3, this illustrates the change in the configuration of the braided sleeve 14 after its length has been decreased to increase its diameter to slip it over the mandrel 10. After it is loosely mounted over and around the mandrel 10, the sleeve 14 is pulled taut to increase its length, whereby the braided sleeve shrinks diametrally and attempts to return to its original configuration illustrated in FIG. 2. This produces the intimate compression molding effect previously described, to tightly conform the sleeve 14 to the mandrel 10.

Referring again to FIG. 1, three additional braided sleeves 14 of glass fiber are shown mounted successively upon the first sleeve 14, with each being enlarged and diminished diametrally on and around the preceding layer. This gives an overall assembly of paper liner 12 immediately over mandrel 10, followed by four successive layers of braided sleeves 14. Since all of the layers 14 are pulled taut axially, the entire assembly is very tightly mounted upon mandrel 10.

Thereafter, a liquid epoxy resin adhesive is applied to the assembly of FIG. 1, excess adhesive is wiped off and the adhesive is allowed to cure to a permanent set. The mandrel 10 is then withdrawn from the consolidated rigid assembly of paper liner 12 and braided glass fiber sleeves 14. The rigid epoxy resin maintains the glass fiber sleeves 14 in the optimum conformed orientation to permanently retain the great strength of the assembly for withstanding reverse osmosis working pressure.

In order to further illustrate the nature of the invention and the manner of practising the same, the following examples are presented.

EXAMPLE I

A mandrel is prepared by cutting to the desired length a polytetrafluoroethylene ("Teflon") rod 0.51 inch in diameter. A single thickness of fine filter paper is moistened with water and wrapped around the mandrel, dried and four layers of braided glass sleeving, nominally ½ inch in diameter, are conformed over the mandrel and the paper line in the manner previously described. The prepared mandrel is then saturated with an epoxy-polyamide-solvent formulation consisting of:

Epoxy resin (ERL 2795): 60 parts (wt.)
Polyamide (Versamid 125): 40 parts
Trichloroethylene: 47 parts The saturated lay-up is then subjected to peristaltic action by wiping it down with a sponge compressed around the circumference of the glass sleeving, to remove as much as possible of the impregnated adhesive. The solvent is then evaporated and the formulation is cured in an oven at 212° F. for two hours, after which the completed porous support tube is easily removed from the mandrel.

EXAMPLE II

A mandrel is prepared by placing a 34 inch length of ½ inch OD x ⅜ inch ID Teflon tubing on a ⅜ inch steel drill rod 3 feet in length. On one end of the steel rod is threaded a round stop nut ½ inch OD. The other end of the steel rod is left bare for gripping.

A 2.1 inch by 22½ inch strip of Whatman No. 1 filter paper is cut from a sheet 22½ by 18¼ inch.

The strip of filter paper to serve as liner is wet with water and carefully placed on the Teflon mandrel and shaped to conform to it with about ½ inch overlap. It is then left to dry.

With one end of the steel rod gripped in a vice, a 2½ foot length of braided glass sleeving ½ inch diamter (style EG 530, Electra Insulation Corp.) is slipped over the filter paper, taped at the free end (i.e., the end that is not in the vice) with an adhesive tape, and then pulled taut. This is repeated for a total of five layers of braided sleeving, pulling each taut to tightly conform the layers to the mandrel.

The lay-up (consisting of the liner and layers of reinforcement) is then removed from the vice and placed on a sheet of polyethylene film.

An impregnating formulation is next prepared consisting of:

| | Parts |
|---|---|
| ERL 2795 (Union Carbide) | 6 |
| Versamid 125 (General Mills) | 4 |
| Trichloroethylene | 40 |

This is mixed thoroughly.

The impregnating formulation is poured over the lay-up and allowed to soak for five minutes while covered with a plastic sheet to prevent evaporation of the solvent.

The lay-up is then placed vertically and the excess resin is squeezed out by wrapping a paper towel around the top end (the end at which the glass sleeving had been taped), grasping it tightly while drawing downward. This "milking" procedure is repeated twice.

The finished lay-up is placed in a hot air circulated oven at 210° F. for two hours in order to cure.

The lay-up is removed from the oven and allowed to cool. The mandrel is next pulled out while the stop nuts prevents the Teflon from coming off the steel rod. The resulting porous tube is then cut to the desired length.

The procedure as just described may be varied in many respects, as will be apparent to those skilled in the art. For instance, the mandrel dimensions may be varied, and other materials of construction may be used. An all metal mandrel may be employed, if it is first coated with a mold release agent.

Other materials may be used for the liner, such as writing paper, glass fiber paper and many other materials. With some of these, the step of wetting the liner prior to placing it on the mandrel may be omitted.

The impregnating formulation may vary widely. For example, other epoxy resins, polyester resins, polyurethane resins and other solvents such as toluene, xylene, methylisobutyl ketone, acetone, benzene, methylethyl ketone, perchloroethylene, methyl alcohol, isopropyl alcohol, chloroform, 1,1,2-trichloroethane, carbon tetrachloride, and others may be used, as well as mixtures.

The method of impregnating the coating may be varied, for example, by brushing or spray-coating.

The removal of excess resin can be effected in a variety of other ways, for example with string or by using a circular squeegee.

The curing time and temperature will vary greatly depending on the resin system, from room temperature to a few hundred degrees and from minutes to days.

In some applications, it is advantageous to employ a plurality of nested supports. Thus, a first support tube may be prepared, having a relatively high porosity and this may be inserted into a second tube, separately prepared, the second tube having a relatively low porosity. The osmotic membrane is then inserted as a liner in the first or inner support tube.

While this invention has been described in terms of certain preferred embodiments and illustrated by way of certain drawings and examples, these are illustrative only, as many alternatives and equivalents will readily occur to those skilled in the art, without departing from the spirit and proper scope of the invention.

What is claimed is:

1. A method of making a porous tubular support for a semipermeable membrane which comprises the steps of placing at least one layer of braided strands of fibrous material around a tubular mandrel, the braided fibrous material having a characteristic capability of undergoing a change in relationship of diameter to length, inversely changing the relationship of diameter to length of said material to conform the material to said mandrel; saturating said layer with a liquid adhesive material in an amount sufficient to consolidate said strands into a rigid structure, but insufficient to fill the interstices between said braided strands, hardening said adhesive and removing the resultant support from said mandrel.

2. A method as in claim 1 wherein said fibrous material is glass fiber.

3. A method as in claim 1 further comprising the step of placing a smooth liner around said mandrel prior to placing said layer of braided strands of fibrous material around said mandrel.

4. A method as in claim 3, wherein said liner material comprises a layer of cloth.

5. A method as in claim 3 wherein said liner material comprises a layer of paper.

6. A method as in claim 1 wherein said saturating step includes the step of eliminating excess adhesive by compressing and wiping said braided strands.

7. A method as in claim 1 wherein said adhesive material is a reactive epoxy resin.

8. A method as in claim 1 wherein said adhesive material is a polyester resin.

9. A method as in claim 1 wherein a plurality of braided sleeves of glass fiber material are placed around said mandrel, each of said sleeves being pulled axially to compress it around said mandrel by diametral shrinkage thereof, said plurality of stretched sleeves being placed successively around said mandrel concentrically with respect to each other.

10. A method of making a porous tubular support for a semipermeable membrane which comprises the steps of placing at least one layer of braided strands of fibrous material around a tubular mandrel, axially pulling said layer to compress it circumferentially to conform to said mandrel, saturating said layer with a dilute liquid adhesive material in an amount sufficient to consolidate said strands into a rigid structure, but insufficient to fill the interstices between said braided strands, placing at least one additional layer of braided strands of fibrous material around said first layer, axially pulling said second layer to compress it circumferentially to conform to said first layer, saturating said second layer with a more concentrated liquid adhesive material in an amount sufficient to consolidate said strands into a rigid structure but insufficient to fill the interstices between said braided strands, hardening said adhesives and removing the resultant support from said mandrel.

11. A method as in claim 1 wherein said tubular mandrel comprises an exterior surface of polytetrafluoroethylene resin.

12. A method as in claim 1 which includes the step of inserting an osmotic membrane within the porous tubular support, thereby providing a porous tubular supported semipermeable membrane.

13. A method as in claim 1 which includes preparing a first porous tubular support having a relatively high porosity and inserting said first tubular support into a second porous tubular support having a relatively low porosity.

14. A method as in claim 3 which includes wetting the liner and shaping the wet liner to conform to the contours of the mandrel.

15. A method as in claim 3 which includes bonding the liner to the inner surface of the porous tubular support.

16. A method as in claim 10 which includes placing a smooth liner around said mandrel prior to placing said first layer of braided strands of fibrous material around said mandrel.

17. A method as in claim 10 wherein said fibrous material is glass fiber.

18. A method as in claim 10 which includes a step of inserting an osmotic membrane within the porous tubular support, thereby providing a porous tubular supported semipermeable membrane.

19. A method of making a porous tubular support for a semipermeable membrane, which method comprises the steps of:
 (a) placing a linear material about a tubular mandrel;
 (b) placing a plurality of braided sleeves of glass fiber material around said mandrel;
 (c) axially pulling each of said sleeves to compress the sleeves circumferentially to conform said sleeve to the mandrel;
 (d) saturating each sleeve so compressed with a liquid adhesive material in an amount sufficient to consolidate the strands into a rigid structure, but insufficient to fill the interstices between the braided strands, thereby maintaining a solvent flow path through the entire tubular support so prepared; and
 (e) hardening the adhesive material and removing the resulting support from the mandrel, thereby providing a porous multilayered tubular support for a semipermeable membrane comprising an internal liner and a plurality of concentric braided glass fiber rigid strands.

20. A method as in claim 1 which includes axially pulling said layer to change its length-to-diameter ratio and to compress it circumferentially to conform to said mandrel.

References Cited
UNITED STATES PATENTS

| | | | |
|---|---|---|---|
| 869,686 | 10/1907 | Bauno | 46—1 R |
| 2,864,506 | 12/1958 | Hiskey | 210—22 X |
| 2,936,257 | 5/1960 | Nailler et al. | 156—160 X |
| 3,399,092 | 8/1968 | Adams et al. | 156—173 X |
| 3,474,703 | 10/1969 | Davis et al. | 156—148 X |
| 3,490,975 | 1/1970 | Lightwood et al. | 156—175 X |

BENJAMIN R. PADGETT, Primary Examiner

E. E. LEHMANN, Assistant Examiner

U.S. Cl. X.R.

156—165, 180, 229; 210—500